United States Patent [19]

Burney

[11] Patent Number: 4,656,407
[45] Date of Patent: Apr. 7, 1987

[54] ELECTRIC MOTOR SERVO CONTROL SYSTEM AND METHOD

[75] Inventor: Charles F. Burney, Orland, Calif.

[73] Assignee: A.R.A. Manufacturing Company of Delware, Inc., Grand Prairie, Tex.

[21] Appl. No.: 745,303

[22] Filed: Jun. 14, 1985

[51] Int. Cl.⁴ ............................................. G05G 5/00
[52] U.S. Cl. ................................. 318/626; 318/434; 123/352; 180/178
[58] Field of Search ............... 318/434, 436, 663, 626; 123/352; 180/178

[56] References Cited

U.S. PATENT DOCUMENTS

| | | |
|---|---|---|
| 3,346,771 | 10/1967 | Sutton . |
| 3,455,411 | 7/1969 | Carp et al. . |
| 3,496,535 | 2/1970 | Tyzack . |
| 3,563,331 | 2/1971 | Kato et al. . |
| 3,575,256 | 4/1971 | Wojcikowski . |
| 3,612,017 | 10/1971 | Ishizaki et al. . |
| 3,648,808 | 3/1972 | Kato . |
| 3,667,020 | 5/1972 | Senzaki . |
| 3,700,996 | 10/1972 | Gutting . |
| 3,715,006 | 2/1973 | Walsh et al. . |
| 3,866,102 | 2/1975 | Hashimoto . |
| 3,946,707 | 3/1976 | Gray . |
| 4,039,043 | 8/1977 | Mann et al. . |
| 4,155,419 | 5/1979 | Mann . |
| 4,157,126 | 6/1979 | Collonia . |
| 4,289,995 | 9/1981 | Sorber et al. ................... 318/436 X |
| 4,314,186 | 2/1982 | Gille ................................. 318/434 |
| 4,336,566 | 6/1982 | Noddings et al. . |
| 4,352,403 | 10/1982 | Burney . |
| 4,385,675 | 5/1983 | Blee . |
| 4,389,990 | 6/1983 | Murray . |
| 4,445,075 | 4/1984 | Fry ................................... 318/434 |
| 4,467,250 | 8/1984 | Thomasson ....................... 318/436 |
| 4,495,454 | 1/1985 | Collonia ........................... 318/663 |
| 4,531,081 | 7/1985 | Liesgang .......................... 318/434 |
| 4,532,567 | 7/1985 | Kade ............................ 318/434 X |
| 4,556,831 | 12/1985 | Sakamoto et al. ................. 318/434 |
| 4,559,577 | 12/1985 | Shoji et al. ........................ 318/434 |

Primary Examiner—Benjamin Dobeck
Attorney, Agent, or Firm—Cox & Smith Inc.

[57] ABSTRACT

A cruise control system of the type utilizing an electrically operated DC servo motor to move an element that varies the fuel-air mixture of a motor vehicle engine to control the speed of the motor vehicle is provided with apparatus for detecting the limit positions of the element and to modify the electric current supplied to the motor accordingly.

7 Claims, 12 Drawing Figures

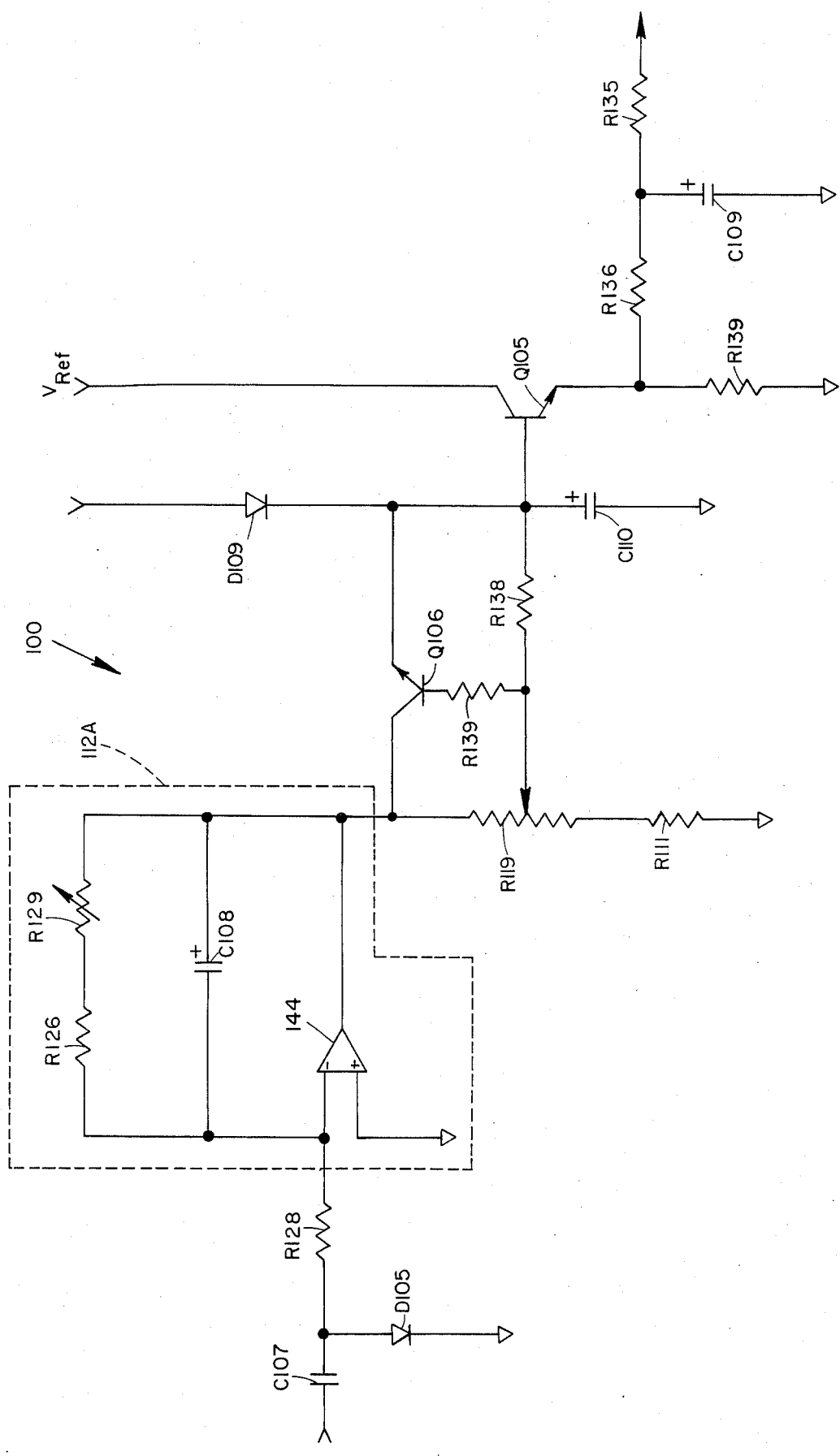

ELECTRIC MOTOR SERVO CONTROL SYSTEM AND METHOD

BACKGROUND OF THE INVENTION

The present invention relates generally to a system and method for controlling the operation of an electric servo in a cruise control system. More particularly, in a cruise control system that incorporates an electric servo motor for moving an element to modify the speed of the vehicle's engine, apparatus and a method is included for detecting when the servo motor is running in a stall position so the motor's operation can be modified to prevent damage to the motor and gear reduction system.

Prior cruise control systems have either used, for the most part, pneumatic (vacuum) actuated elements or electric motors as the "servo" mechanism. The servo connects to and effects movement of an engine element for varying the speed of the engine, and thereby controls vehicle traveling speed. Typically, the engine element controlled by the servo is the engine's throttle valve or linkage connected to the throttling valve, although it may also be used on an injected system. Examples of prior cruise control systems employing vacuum servo actuation of the throttle valve are disclosed in U.S. Pat. Nos. 3,455,411, 3,575,256, 3,946,707 and 4,352,403. Although effective to control the speed of many motor vehicles, these vacuum servo actuated cruise control systems suffer from a lack of adequate response to some given motor vehicle speed conditions, such as found in highly uneven terrain. This problem is exacerbated as internal combustion engines become smaller, because the available vacuum becomes more limited. Since these smaller engines typically operate at higher RPM and, therefore, larger throttle openings, the negative manifold pressure available to operate the vacuum servo will be less, which necessitate the use of an even larger vacuum servo on a smaller engine. Further, a vacuum servo actuator will be demanding vacuum at a time when the engine's negative manifold pressure is decreasing. This problem can be overcome through employment of an auxiliary vacuum pump, but the solution increases cost, both in terms of the added parts and in terms of the labor required for the installation time.

Motor vehicles can have many locations to which the vacuum source for the vacuum servo motor can be attached. Unfortunately, the most convenient location (and the one typically used to save time) is near the brake system, because the vacuum source is generally the most reliable, and because the manifold is provided with a convenient opening for a vacuum line at this location. However, this location does not provide a hook-up conducive to proper and efficient operation of the system. A hook-up which uses a vacuum-operated brake system to power the cruise control system causes a deterioration in both brake operation and cruise control operation.

Pressure servo actuators are another type of servo which has been contemplated, but these have found very rare application in conventional motor vehicles due to the lack of an available positive pressure source in today's automobiles. This can be supplied by a separate pump, but once again cost and installation time are increased.

Many of the problems identified above can be solved or at least mitigated by employing an electric servo motor in the cruise control system for moving the throttle valve (or other element). Not only is the size of electric servo motors much smaller, they can respond more quickly and reliably in uneven terrain. Further, the electric current supply can be made relatively independent of the operating limitations of the engine (versus dependence on the engine speed or brake vacuum pressure), the electric motors are inexpensive, and location of the motor is more flexible because the motor only need be connected to the power source by a wire, versus a vacuum hose.

However, electric motor servo cruise control systems are not without their own problems. One such problem concerns protection of the DC motor when the movable element (i.e., engine throttle valve) is moved to one of its extreme positions. If the electronics controlling the servo motor direct the servo to move the throttle valve toward an increase in speed, the motor and connecting gears on the servo are engaged in the direction which will move the throttle valve toward a more open position. The movement will continue until the desired speed is reached and the electronics direct the servo to stop or to reverse. If the throttle valve is moved to its full throttle position, but the electronics direct the servo to keep increasing (i.e. when on a very steep incline), the DC motor will attempt to continue movement as long as a drive current is supplied thereto. This can result in damage to the gearing or linkage that connects the servo to the throttle valve, or damage to the motor itself. Present techniques employ an electromechanical limit switch that is tripped to cut off the servo motor when the throttle valve reaches its full throttle position or idle position.

However, the designs of throttles in today's motor vehicles differ widely in the distances of throttle valve travel from idle to full throttle position. Some have a linear movement of approximately one inch, while others may be 1.75 inches and beyond. This wide range of throttle movement requires the position of each electromechanical limit switch to be set and adjusted at the time each cruise control system is installed. This can significantly increase the cost of the cruise control system, as well as affect its efficiency and operation. Cost is affected in terms of increased parts and the extra labor required for installation, because the limit switch must be adjusted for every model type engine. Even in a factory installation the wide varieties of engine models encountered during the assembly process requires a manufacturer to keep on hand large stocks of spare parts in a wide variety of servos set to different limits, it if was attempted to use non-adjustable limit switches. Efficiency can be affected when the limit switch is installed incorrectly, which may unnecessarily limit full throttle travel or allow excessive travel, which will damage linkage.

Similarly, the idle position must also be detected by the DC servo motor so the motor will not attempt to drive beyond the position corresponding to throttle idle, again possibly damaging the linkage, the motor, or both. Electromechanical limit switches are again used today to detect this limit, with the same problems described above.

Accordingly, it can be seen that there is a need for apparatus capable of detecting the limits of operational travel of an electric motor actuator when used in cruise control systems, but one that is not encumbered by the necessity of having to adjust the limit means individually for each motor vehicle installation.

SUMMARY OF THE INVENTION

The present invention provides a method, and discloses apparatus for employing the method, to detect the operational limits of travel in an element that adjusts a motor vehicle's engine's speed. This limit detection permits modification or termination of the current supplied to the electric servo motor and/or protects the motor and the linkage connecting the motor to the controlled element by the use of clutches in the gear train. The method and apparatus detects these operational limits independent of any electromechanical limit switch and, therefore, can provide a cruise control system that is responsive to different throttle travel distances, thereby avoiding the installation and inventory problems heretofore encountered. Several alternative embodiments are disclosed which carry-out the general goal of a cruise control system employing an electric servo motor adapted for use in all types of vehicles.

In the first and preferred embodiment of the invention, a resistance is placed in the circuit path that conducts current to the electric servo motor. When the servo motor moves a vehicle's throttle to its full-throttle position, so that operational travel of the servo motor is inhibited, the drive current of the servo motor will increase. This increase is sensed by limit detection circuitry to produce a limit signal that is used by the motor drive circuit to terminate the drive current. A similar circuit may be provided to terminate the drive current when the servo is in the idle position, although the preferred embodiment would do this by simply terminating the drive current with a potentiometer driven by the throttle movement to a minimum resistance.

An alternative embodiment would use the potentiometer affixed to the throttle and set to predetermined resistances when the throttle is in its idle or full open position. When the servo motor current directs the servo motor to pull or push the throttle to either extreme position, detection circuitry senses the particular position of the throttle via the potentiometer to again terminate drive current to the servo motor. Also, combinations of the first and second embodiments could be used, for example, using the potentiometer to cut off the servo motor in the full open position and the limit detection circuitry could terminate the motor in the idle position.

Another alternative embodiment provides for a clutch in the gear train between the servo motor and the throttle which would limit the maximum load reflected from the throttle linkage to the gear train after the maximum travel limit has been reached by the throttle. A torque limiting clutch, which begins to slip as the torque limit which it was designed for was exceeded, could be used in combination with an electromechanical clutch of the a positive engagement type. However, a friction type electromechanical clutch could be used in place of the above clutches. These clutches are capable of being combined with any of the other embodiments.

Another alternative employs a controlled acceleration circuit to slow the action of the servo so that the throttle is not opened any faster than the motor vehicle is capable of accelerating. Because the maximum set speed of the cruise control is less than the maximum speed of the vehicle, the throttle would never be completely opened and there would be no danger of servo motor damage.

In addition to the advantages mentioned above, the present invention has advantages not even addressed by the use of electomechanical limit switches: If, for whatever reason, throttle travel is mechanically stopped (as by jamming or other means that inhibits throttle travel) before the full-throttle position is reached, the invention will react accordingly to terminate motor current. If electromechanical limit switches were used, the possibility exists that such a premature stop of throttle travel would go undetected, with possible motor damage as a result. However, by sensing the stall condition of the servo motor, the servo motor can be limited or terminated, even though the full-throttle or idle position is not reached.

Another advantage to the present invention is the decrease in cost enjoyed by persons assembling or installing the cruise control systems. Because the present invention is capable of being installed in almost every model of engine, a much simpler and smaller inventory of replacement systems can be kept by manufacturers and installers. For example, instead of having to stock parts or provide adjustment instructions for the many hundreds of models of engines, the present system could be used.

These and other advantages of the present invention will become evident to those skilled in this art upon a reading of the following detailed description of the invention, which should be taken in conjunction with the accompanying drawings and claims.

BRIEF DESCRIPTION OF THE DRAWINGS

FIG. 10 is a schematic diagram of the controlled acceleration circuit used in the fourth embodiment.

DETAILED DESCRIPTION OF THE INVENTION

Figure 1:
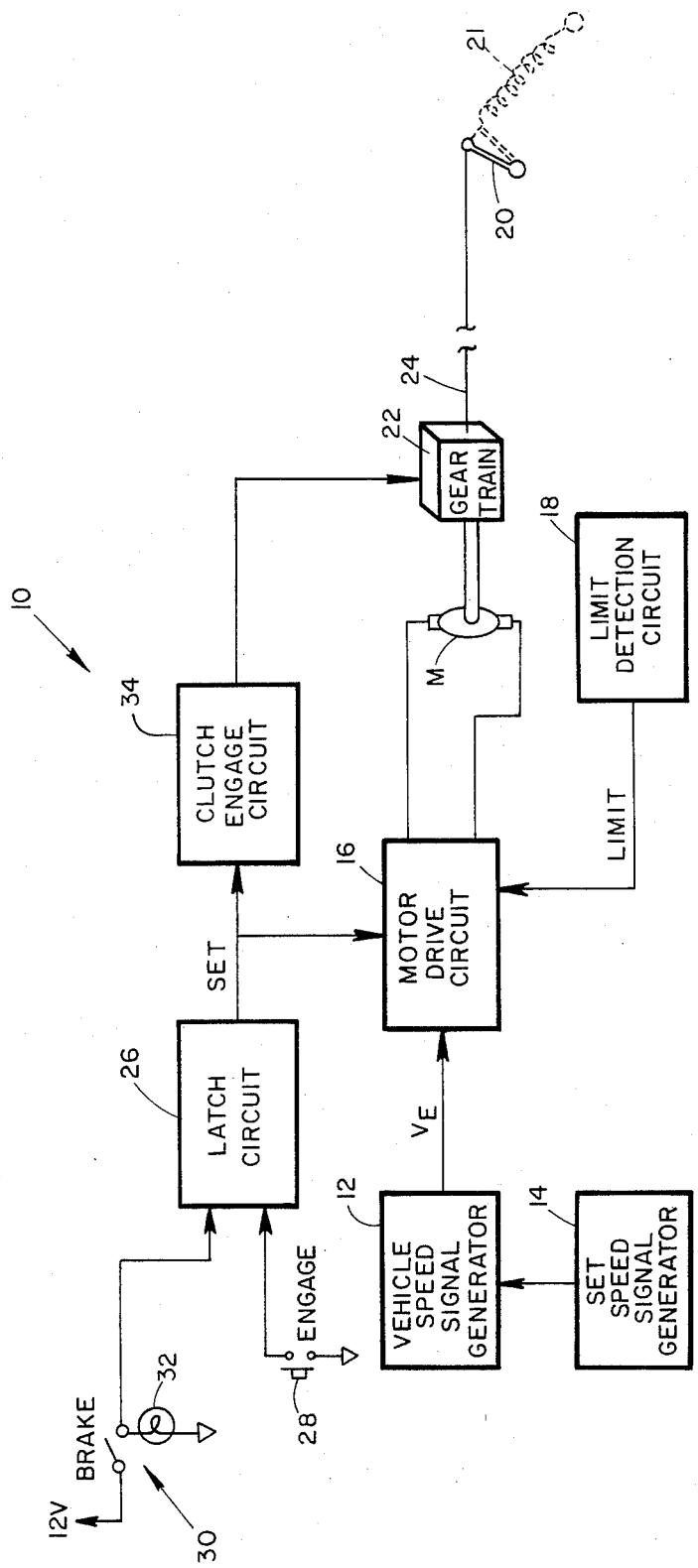
FIG. 1 is a block diagram of an electric motor servo control system incorporating the first embodiment.

Referring now to the drawings and, in particular, FIG. 1, the first embodiment of an electric motor servo control system, designated with the reference numeral 10, is shown. It should be noted that these drawings and description only describe a portion of an overall cruise control system, and that other elements, known to those in the art, must be added to connect the invention to the overall cruise control system. The system 10 includes a vehicle speed generator 12 and a set speed signal generator 14 which is coupled to a motor drive circuit 16 for transmitting an error voltage $V_E$ to the motor drive circuit 16. The motor drive cirucit 16 is connected to a DC motor M which, in turn, is connected to a throttle valve throw arm 20 via linkage that includes a gear train 22 and a cable 24. A LIMIT signal indicative of the operational limits of throttle valve travel is produced by a limit detection circuit 18 and is coupled to the motor drive circuit 16.

Although, as has been mentioned, the clutch C is capable of being a separate embodiment, the preferred embodiment using the limit detection circuit incorporates clutch C as well. The clutch C, not shown in FIG. 1, is incorporated within the gear train 22 and will be explained later.

The control system 10 of FIG. 1 further includes a latch circuit 26 that receives signals from a finger-depressable ENGAGE switch 28 and a brake light switch 30 of the vehicle. The ENGAGE switch 28 sets the latch circuit 26 to its set state, causing it to issue at its output a SET signal. Alternatively, closure of the brake light switch 30, which is connected in series with the brake lights 32 of the vehicle, will cause the latch circuit 26 to be reset from the set state.

A. The Motor

In all of the embodiments of the invention, the DC motor M may be a multi-pole armature, permanent magnet field type motor, such as is known in the art. Under no load conditions, the motor may be designed to operate at approximately 5,000 RPM in response to a drive current of approximately 0.130 amperes from a 12 volt source. Under load conditions, the motor may be designed to operate at approximately 4,000 RPM in response to a current of approximately 0.50 amperes or less, and provide a useable torque of approximately 1.2 inch ounces.

B. The Clutch

Figure 7:
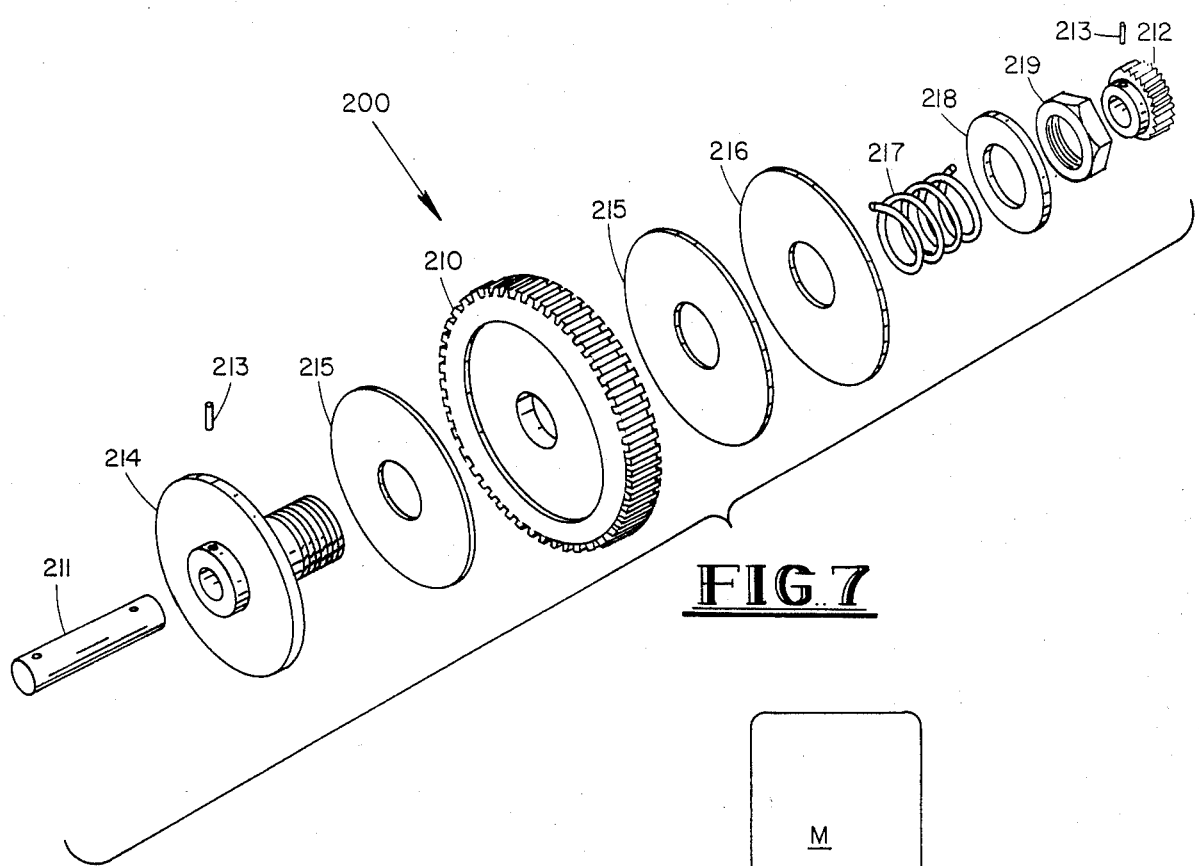
FIG. 7 is an exploded view of the torque limiting type clutch embodiment.

The clutch C may actually be a combination of a torque limiting clutch and an electromechanical clutch of types known in the art. The electromechanical clutch may be a positive engagement type clutch or a friction type clutch such as are known in the art. The friction type clutch is capable of operating in the drive train 22 without the combination of the torque limiting clutch. Other embodiments, to be described, use a torque limiting clutch 200, in combination with the positive engagement type clutch. One type of torque limiting clutch 200 is shown in FIG. 7. Although the clutch C and the gear train 22 are being described at this juncture, it is understood that the clutch C forms a separate embodiment of the invention.

An exploded view of the torque limiting clutch 200 is shown in FIG. 7. These types clutches are known in the art and various designs are contemplated. The torque limiting clutch 200 shown in FIG. 7 is comprised of a driven gear 210 and drive gear 212, the drive gear 212 fixably mounted on a shaft 211 by a pin 213. At the other end of the shaft 211, a force plate 214 is fixably mounted to the shaft 211 by another pin 213. Also mounted on the shaft 211 are frictional plates 215, a second force plate 216, a spring 217, a washer 218 and a torque adjusting nut 219. The parts are mounted on the shaft 211 as indicated in FIG. 7, and the torque adjusting nut 219 tightened to the desired setting so that the friction plates 215 will prevent the driven gear 210 from slipping until a certain torque is reached (i.e., when the throttle is full open or full closed). A torque limiting clutch 200 such as described above is available from Stock Drive Products of New Hyde Park, N.Y.

The designs of both the frictional type and positive engagement type electromechanical clutch are well known in the art. Again, Stock Drive Products of New Hyde Park, New York, produces frictional type and positive engagement type electromechanical clutches. Further, in place of the frictional type and positive engagement type electromechanical clutches, it is contemplated that a Sprague electomechanical clutch or a magnetic particle electromechanical clutch, such as manufactured by Reel Precision Manufacturing Corporation of St. Paul, Minn., could be used. Other domestic manufacturers produce the magnetic particle electromechanical clutch.

C. The Gear Train

The gear train 22 is of a design which provides torque multiplication of the motor M to move the throttle throw arm 20 against a bias spring (illustrated in phantom in FIG. 1 and designated with the numeral 21). The bias spring 21 functions to return the throttle valve (not shown) to its idle position. The gear train 22 has a gear ratio of approximately 286:1 in the present embodiments to provide a torque multiplication enabling the servo motor M to operate against a force of up to 10 kg. That is, the servo motor M can hold against a force exerted on the cable 24 of 10 kg with no excitation current applied to the motor M. If an excitation current is applied to the motor M, it can pull against a force of 10 kg at a rate of approximately one inch per second.

Figure 8:
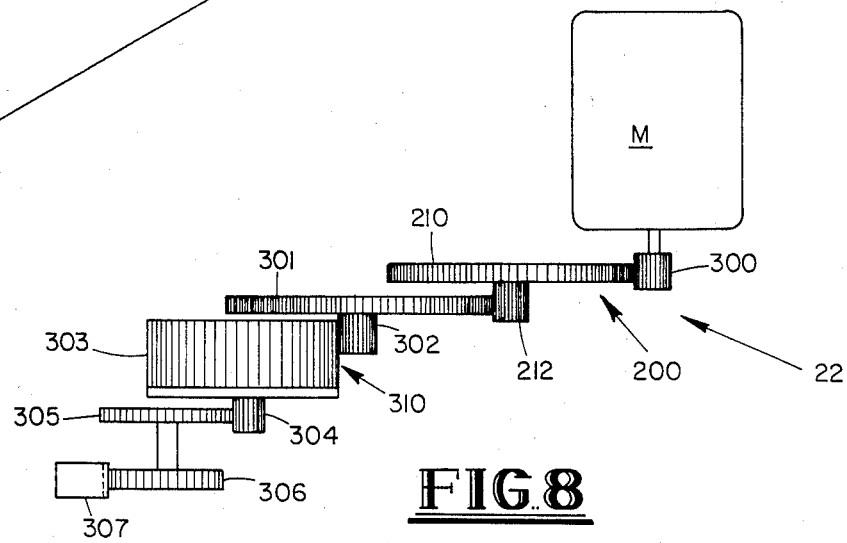
FIG. 8 is a schematic view of the gear train employing the electromechanical positive engagement type clutch embodiment.

The gear preferred for the gear train 22 driven by the torque limiting clutch 200 are of the spur type, straight cut, to keep frictional losses at a minimum. A block diagram of the gear train 22 is shown at FIG. 8. The gear train 22 shown in FIG. 8 would be the one used if the clutch C is to be used as a control system for the servo motor in a separate embodiment. If limit detection circuitry, to be described, is used in the servo motor control system, such as in the preferred embodiment, then the torque limiting clutch 200 shown in FIG. 8 would be replaced by a regular gear and pinion. In FIG. 8, the motor M drives the motor pinion 300, which in turn drives the driven gear 210 of the torque limiting clutch 200. The driving gear 212 of the clutch 200 drives a spur 301 which drives a drive spur 302. The drive spur 302 in turn drives a gear 303, which is the driven gear of a positive engagement type electromechanical clutch, designated as 310. The electromechanical clutch in turn drives a driven spur 304, when engaged, which in turn drives a final spur 305. The final spur 305 drives a rack drive gear 306, which in turn moves a rack 307. It is the rack 307 which pulls or releases the cable 24 to vary the motor vehicle engine speed, and such racks 307 are known in the art. Further, the rack is directly connected to a linear potentiometer (not shown) called the "servo potentiometer", and whose function is described later.

Figure 9:
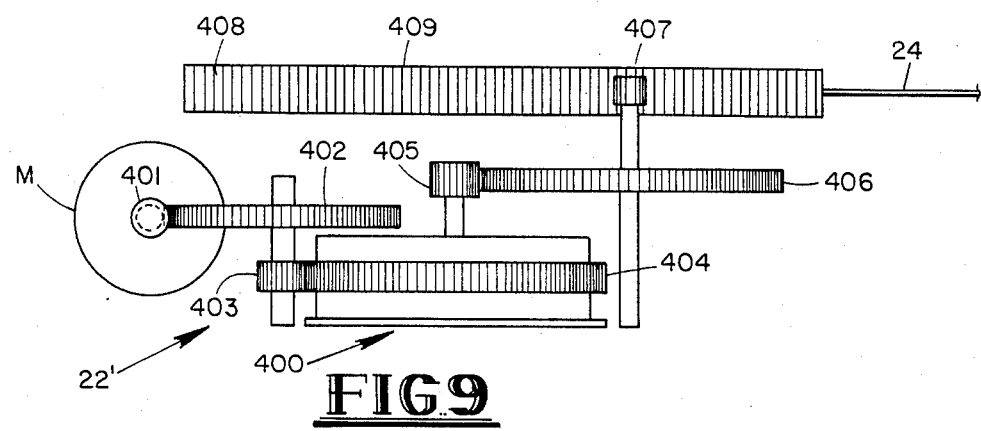
FIG. 9 is a schematic view of the gear train employing the electromechanical friction type clutch embodiment.

An alternative gear train 22' designed for the friction type clutch 400 is shown in block diagram in FIG. 9, in which the motor M drives a motor worm gear 401. In the alternative gear train 22', the friction type clutch 400 is not combined with a torque limiting clutch 200 as in FIG. 8, because the friction type clutch 400 inherently contains torque limiting capability. The motor worm gear 401 drives a driven worm gear 402, which in turn drives the worm pinion 403. It is the worm pinion 403 which drives the friction clutch spur 404, so that when the electromagnetic portion of the friction clutch 400 is engaged, it will drive the clutch pinion 405. In turn, the clutch pinion 405 drives a final spur 406 and final pinion 407 combination, with the final pinion 407 being responsible for driving the rack gear 408 for causing a rack 409 to pull or release the throttle throw arm 20.

Referring back to FIG. 1, the clutch engage circuit 34, upon receiving the SET signal, will engage the friction clutch 400 or the positive engagement clutch 310, depending on the embodiment used.

D. General Operation of the System

The servo control system 10 of FIG. 1 operates within a cruise control system generally as follows: The servo control system 10 is put into the control mode when the ENGAGE switch 28 is depressed, setting latch circuit 26 and sending the SET signal. This initial SET signal would be a HIGH signal, for reasons to be explained later. This causes the clutch engage circuit 34 to activate the clutch C, establishing connection between the motor M and the throttle throw arm 20 via the gear train 22 and pull cable 24. The vehicle speed signal generator 12 may be of the type known in the art that includes a pair of magnets (not shown) mounted on the drive shaft of the vehicle (not shown) with a pick-up coil (not shown) positioned proximate the magnets. As the drive shaft rotates, the magnets generate a signal that is representative of the actual speed of the vehicle. The set speed signal generator 14 provides a signal, to be explained below, that represents the speed desired by the operator of the vehicle. These two signals are combined, in a manner discussed below, to produce an error signal $V_E$ that is compared by the motor drive circuit 16 to a pair of predetermined voltage levels. As the present invention is relating to the control system for the servo, the manner of connection between the set speed signal generator 14 and the latch circuit 26 is not explained, because it is part of an overall cruise control system which is known in the art. Other details, such as safety circuitry and low speed threshold circuitry are also omitted for purposes of focusing on the present invention. Returning to the error voltage $V_E$, if the comparison is unequal (i.e., not within a predetermined range, as will be discussed below), the motor drive circuit 16 will issue a DC current of a polarity that will cause the motor M to rotate one way or another. The rotational movement of the motor M is transmitted to the throttle throw arm 20 via the gear train 22 and the cable 24. If the error between the actual vehicle speed and desired vehicle speed is large enough, the throttle valve (not shown) will be moved to its full throttle position by the rotational movement of motor M. Limit detection circuit 18 will sense this condition, and generate the LIMIT signal. Responding to the LIMIT signal, the motor driven circuit will terminate drive current to the motor M, and the throttle valve will be held in its full throttle position until the desired speed is reached, and the motor M is caused to rotate to move the throttle valve away from the full throttle position, or either the circuit is broken by application of the brake.

E. Controlling the Motor Drive Circuit

Figure 2:
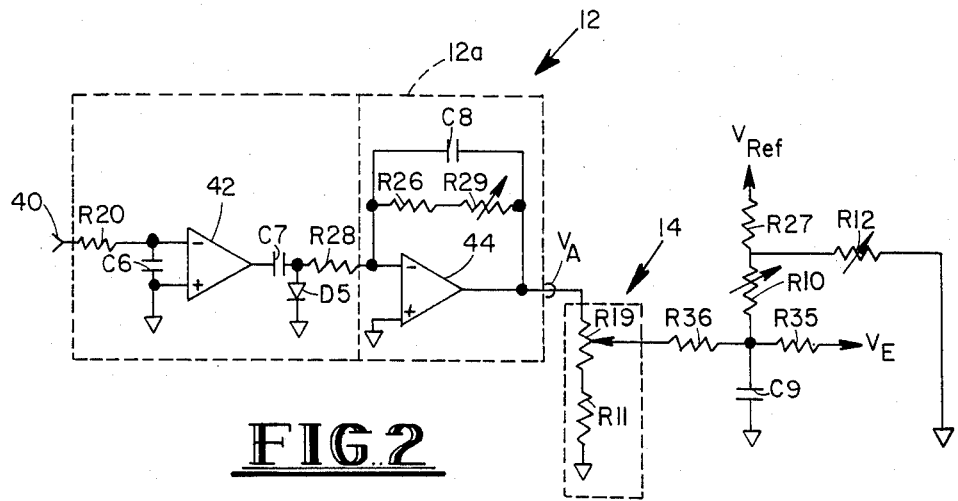
FIG. 2 is a schematic diagram of the vehicle speed and set speed signal generators shown in FIG. 1.

Referring now to FIG. 2, the vehicle speed and set speed signal generators 12 and 14, respectively, are illustrated in greater detail. The vehicle speed signal generator 12 receives a pulsed signal at an input terminal 40 produced by the magnetic transducer portion of the vehicle speed signal generator 12 referred to above. The received signal is then carried to the inverting (−) input of amplifier 42 via resistor R20, which is connected to capacitor C6 to filter the input signal and eliminate "noise" pulses. The output of the amplifier 42 has its positive excursions of the output of C7 clipped by the diode D5, allowing the negative excursions to be coupled by capacitor C7 and resistance R28 to the inverting input of the amplifier 44 of an integrator circuit 12A. The feedback capacitor C8, together with feedback resistor R26 and variable resistor R29, set the time constant of the integrator circuit 12A. The resultant output of the amplifier 44 is the actual speed signal $V_A$ and includes a DC voltage having a level corresponding to the frequency of the pulses received at the input terminal 40, with a small sawtooth ripple proportional to the frequency of the input pulses. The function of the integrator circuit 12A is to produce a DC voltage proportional to frequency, as received at the input terminal 40 from the transducer. The variable resistor R29 is placed within the integrator circuit 12A to allow adjustment of the system 10 for the various size drive shafts found on motor vehicles. In other words, the pulses generated by the transducer will vary according to the size of the drive shaft of the particular motor vehicle, so that it is possible that the same pulse frequency could correspond to two motor vehicle speeds in different motor vehicles. Thus, the variable resistor R29 is adjusted to compensate for these differences.

FIG. 2 also illustrates the set speed signal generator 14, which is shown as including a potentiometer R19 in series with a resistance R11. Typically, the potentiometer R19 is connected to a manually operable dial or knob (not shown) that is calibrated. Rotation of the dial (not shown) results in concomitant rotation of the potentiometer R19. In the preferred embodiment, the dial (not shown) is mounted on an arm of the steering column of the vehicle.

The output or "wiper" of the set speed potentiometer R19 develops an error voltage $V_E$ that is indicative of the error between the actual vehicle speed $V_A$ and the vehicle speed desired by the operator, as set by the potentiometer R19. The resistor R11 sets a minimum at which the cruise control system will operate, e.g. 30 miles per hour. The set speed potentiometer R19 acts to add resistance in accordance with the wishes of the driver; for example, by increasing the resistance from potentiometer R19, the driver increases the voltage provided to the motor drive circuit 16 to decrease the set speed of the vehicle. This voltage $V_E$ is applied to a single-pole R/C filter that includes resistance R36, and capacitor C9. A reference voltage $V_{Ref}$ adds additional voltage to resistor R35 proportional to the servo's position. This is accomplished by a servo potentiometer R12. The servo potentiometer R12 is mechanically connected to the rack gear 408, shown in FIG. 9. The servo potentiometer R12 is of a linear type, so that movement of the rack gear 408 inward and outward varies the resistance. As the reference voltage $V_{Ref}$ is applied to resistor R35 through resistors R27 and potentiometer R10, it is further modified by this mechanical variation of servo potentiometer R12 to "oppose" the error voltage $V_E$. This operation is better described as the "sensitivity" circuit, because the feed-back voltage supplied by the servo potentiometer R12 is generally very small when compared to the voltage of the vehicle speed $V_A$. The sensitivity circuit performs the function of preventing "hunting" by the servo, as it tends to overshoot the bias levels established by R34, discussed below. In other words, by setting the potentiometer R10, one is capable of determining how much throttle pull is obtained for a given error. One advantage to this configuration is that less expensive DC electric servo motors M may be used. This is so, because the sensitivity circuit tends to compensate for inertia developed by the armature of the servo motor M. In the past, servo motor armatures were specially designed and constructed to hold the inertia developed by the armature rotation to a minimum, for example, by using hollow shafts or lightweight materials. This is no longer necessary with the present invention.

Figure 3:
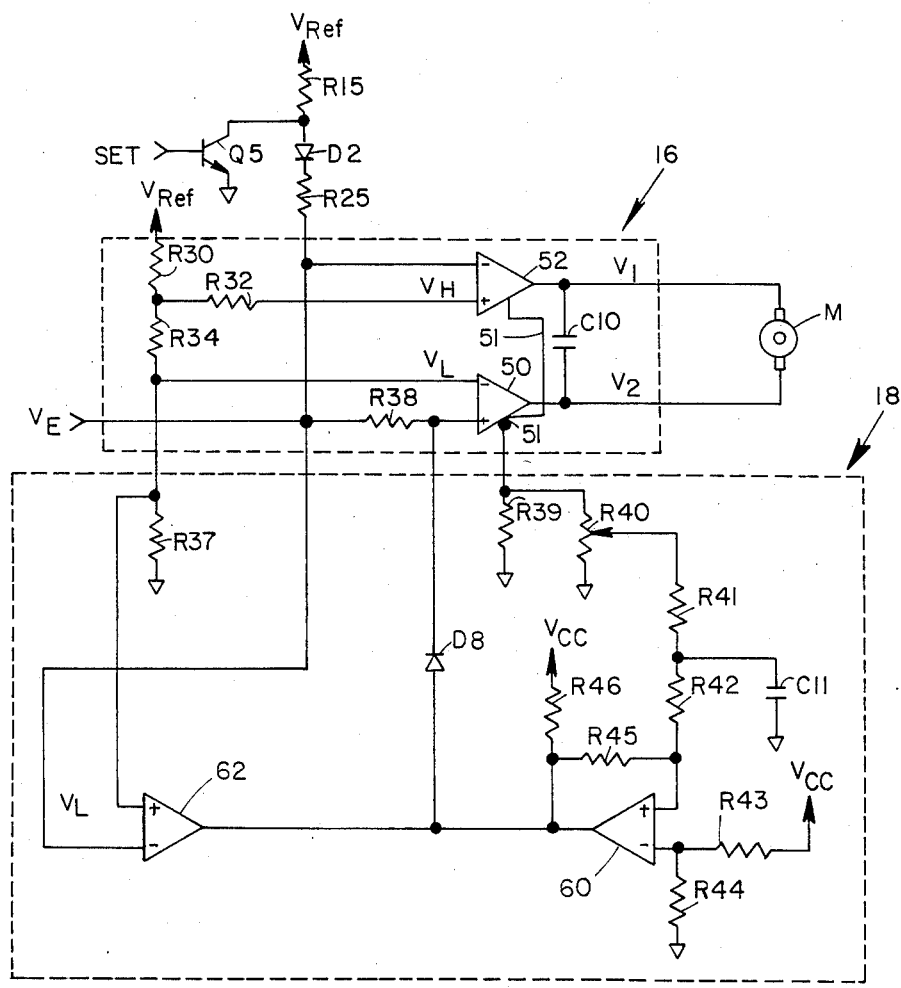
FIG. 3 is a schematic diagram of the motor drive circuit shown in FIG. 1, and a schematic diagram of the limit detection circuit of FIG. 1.
Figure 5A:
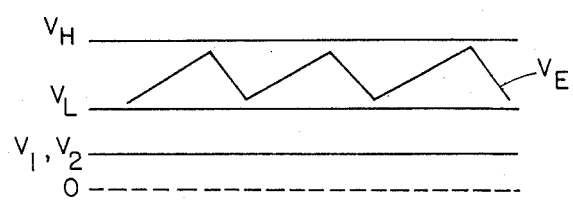
FIGS. 5A-5C are graphic representations of the motor drive current produced in response to the various error signals produced by the circuit of FIG. 2.
Figure 5B:
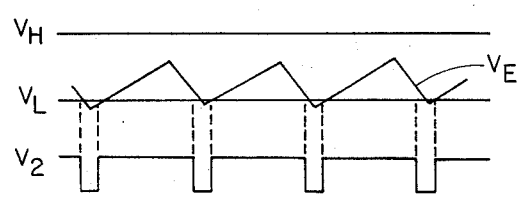
Figure 5C:
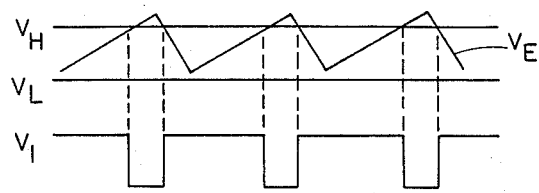

Referring to FIG. 3, which illustrates in greater detail the motor drive circuit 16 and a limit detection circuit 18, the error voltage $V_E$ is received from R35 (FIG. 2) and is compared by each of the amplifiers 50 and 52 to DC voltage levels produced by a voltage divider comprising resistors R30, R34, and R37 connected between the supply voltage, $V_{Ref}$ (typically 8 volts), and ground potential. The resistance R34 of the voltage divider network provides a band of voltage within which the motor M is not effected. The amplifier 52 compares the error voltage $V_E$ to a high voltage level $V_H$ and the amplifier 50 compares the error voltage $V_E$ to a low voltage level $V_L$. The comparison by the amplifiers 50 and 52 is shown in FIGS. 5A-5C.

Figure 4:
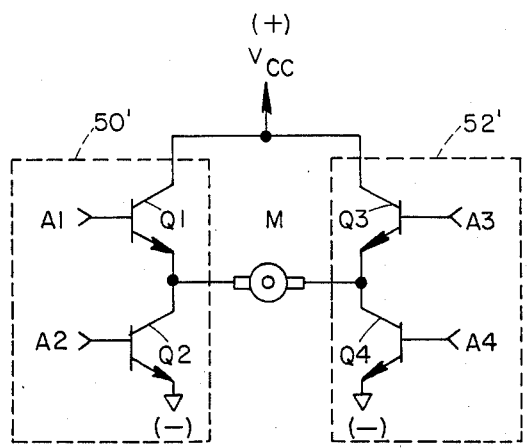
FIG. 4 is a schematic diagram of the output amplifiers used in the drive circuit of FIG. 3.

The amplifiers 50 and 52 are preferably those manufactured by National Semiconductor under the Part No. LM2877. These are integrated circuits having an output structure comprising a pair of power transistors connected in totum, push-pull fashion between the supply voltage $V_{CC}$ and ground, in the manner schematically illustrated in FIG. 4. As shown, the output structure of the amplifiers 50 and 52, designated in FIG. 4 with the reference numerals 50' and 52', generally include transistor pairs Q1/Q2 and Q3/Q4, respectively. Each transistor pair is connected to form a major current path between the supply voltage $V_{CC}$ and ground, and receive internally generated signals A1-A4 at their respective base leads. Motor M, as FIG. 4 illustrates, connects to the emitter-collector connections of the transistor pairs Q1/Q2 and Q3/Q4.

Amplifiers 50' and 52' are structured so that if the voltage level applied to their noninverting (+) inputs exceeds that at their inverting (−) inputs, output transistors Q1 and Q3 will be in conducting states and output transistors Q2 and Q4 will be non-conducting. If the converse is true, transistors Q2 and Q4 conduct, and transistors Q1 and Q3 are nonconducting. To put it another way, a HIGH output (designated $V_H$) to the motor M is established by the amplifier output stage 50' when transistor Q1 is in a conducting state and transistor Q2 in a nonconducting state. Likewise, a LOW output (designated $V_L$) to the motor M finds transistor Q1 off and transistor Q2 on. Thus, if the error voltage $V_E$ is between the voltage levels $V_H$ and $V_L$, the outputs of amplifiers 50 and 52 will be HIGH and the transistors Q1 and Q3 of the amplifier output stages 50' and 52' will be placed in conducting states, applying the supply voltage $V_{CC}$ to both terminals of the motor M. Since no difference in potential across the DC motor M exists, there is no current flow and the motor M will not rotate.

If, however, the error voltage $V_E$ drops below the low voltage level $V_L$ (as would happen if the actual speed were greater than the desired speed) the output of amplifier 50 goes LOW, as the transistor Q1 would be turned off, the transistor Q2 turned on, and a low voltage level (approximately ground) is applied to one terminal of the motor M. Since the output of amplifier 52 is still HIGH, transistor Q3 is still on and the other terminal of motor M remains coupled to $V_{CC}$. Thereby, a motor current flows through the motor M to cause it to rotate. In a similar fashion, if the error voltage $V_E$ is greater than the high level voltage $V_H$, transistor Q3 of the output stage 52' is turned off, and transistor Q4 is turned on. This time, the lower voltage level is applied to the other terminal of the motor M to create a motor current that causes the motor M to rotate in an opposite direction. Between the outputs of amplifiers 50 and 52 is a capacitor C10 to filter noise generated by the motor brushes, as shown in FIG. 3.

Referring again to FIG. 3, in the ground lead 51 of the amplifiers 50 and 52 there is inserted a resistance network comprising a parallel connection of resistor R39 and potentiometer R40. These resistances form a part of the limit detection circuit 18. The wiper arm of the potentiometer R40 is coupled via an integrating filter, formed by resistor R41 and capacitor C11, to the noninverting input of amplifier 60 via resistance R42. Amplifier 60, together with the feedback resistance R45, forms a latch whose output is normally LOW, a condition that is established by the voltage divider network of R43 and R44 which couples a small positive voltage to the inverting input of the amplifier 60. As long as the voltage applied to the inverting input of amplifier 60 is greater than that applied to the noninverting input (which is directly related to the drive current of the motor M) the output of amplifier 60 of the amplifier 60 will be LOW. If the voltage applied to the noninverting input of amplifier 60 exceeds that applied to the inverting input, the output of amplifier 60 will go HIGH. Since this HIGH is fed back by the resistor R45 to the noninverting input, the amplifier 60 will hold this latched state. The output of amplifier 60 will travel diode D8 to the noninverting input of amplifier 50 to change the output of amplifier 50 to positive. Because the output of amplifier 52 is also positive, the motor M will cease to rotate.

The amplifier 60 is reset from its latched state by a reset circuit formed by amplifier 62, which has its output sharing the pull-up resistor R46 with the output of the amplifier 60. The inverting input of amplifier 62 receives the error voltage $V_E$, while the noninverting input receive a reference voltage $V_{Ref}$ established by the resistances R30, R34 and R37.

Referring to FIGS. 1-3, the servo control system 10 is put into operation when the ENGAGE button 28 is depressed to set the latch circuit 26 and bring up the SET signal. Presence of the SET signal causes the clutch engage circuit 34 to activate the electromagnetic clutch 310 or 400, connecting the gear train 22 and, via the cable 24, the throttle throw arm 20. In addition, the SET signal turns on transistor Q5 (FIG. 3) to condition the motor drive circuit 16 for operational response to the error voltage $V_E$.

Assume that the vehicle is traveling at something less than 55 miles per hour when the ENGAGE button 28 was depressed. Assume further that the manually operable dial (not shown) connected to the wiper arm of the potentiometer R19 has been set by the operator for a desired vehicle speed of approximately 55 miles per hour. The error voltage $V_E$ will be greater than the voltage levels $V_H$ and $V_L$, causing the output voltage $V_2$ of amplifier 50 to be HIGH while the output voltage $V_1$ of the amplifier 52 will be LOW. This will cause the motor M to rotate in a direction that pulls the cable 24 (FIG. 1), and along with it the throttle arm 20, to open the throttle, varying the engine's fuel-air mixture to increase engine speed and, with it, the vehicle speed.

Assume now that the difference between the actual vehicle speed and the desired vehicle speed is sufficient to cause the motor M to rotate and move the throttle valve (not shown) to a full-throttle position and against a throttle stop. This will cause the motor M to cease rotating, but since the error voltage $V_E$ causes the amplifiers 50 and 52 to continue applying a difference voltage across the motor M, the motor current continues to flow through motor M. The motor M is now approaching a stall condition, and the motor current increases. This increase is reflected in the ground lead 51 of the amplifiers 50 and 52, developing a voltage across resistance R39 and the potentiometer R40. The voltage so developed is applied to the noninverting input of amplifier 60 which makes that input greater than the input applied to the inverting input of amplifier 60. Accordingly, the output of the amplifier 60 will go HIGH, and via the feedback resistance R45, the amplifier 60 latches in this HIGH state.

The HIGH produced by amplifier 60 is coupled to the noninverting input of amplifier 50 via the blocking diode D8 to cause the output voltage $V_2$ of the amplifier 50 to return to a HIGH level. Both output voltages $V_1$ and $V_2$ are now HIGH and, therefore, motor current through motor M terminates. As the vehicle speed increases, so will the error voltage $V_E$ until a voltage level greater than $V_L$ is reached. This causes the output of amplifier 62 to become LOW to reset the latch formed by amplifier 60 to a LOW output. As the vehicle speed increases still further the error voltage $V_E$ will become greater than that voltage level $V_H$, causing the amplifier 52 output voltage $V_1$ to go LOW while $V_2$ remains HIGH. The motor M is thereby supplied with a motor current to cause it to rotate in a direction that allows the throttle valve (not shown) to be pulled by the bias spring 21 away from the full-throttle position.

In the event the brake pedal (not shown) of the vehicle is depressed by the operator, the brake switch 30 closes, applying a 12-volt DC voltage to a reset input of the latch circuit 26 (FIG. 1). The SET signal goes LOW, and the clutch engage circuit 34 responds by causing the electromagnetic clutch 310 or 400 to disengage, breaking the coupling between the motor M and the throttle valve. Thus, the throttle valve (not shown) is released from the control of the servo control system 10 and allowed to be pulled to its idle position.

In the event that, for some reason, the clutch engage circuit 34 fails to operate properly to deactivate the electromagnetic clutch 310 or 400 and disconnect the motor M from the throttle valve (not shown), a fallback "go home" circuit is provided, as shown in FIG. 3. When the SET signal goes LOW, the transistor Q5 (FIG. 3) ceases conduction. Previous to the SET signal going LOW, transistor Q5 was in a condition state, which effectively grounded the voltage supplied by the reference voltage $V_{Ref}$ through resistor R15. As the set signal goes low, and the transistor Q5 ceases conduction, the reference voltage $V_{Ref}$ flows to the inverting input of amplifier 52 through resistors R15 and R25, which drops the voltage. The error voltage $V_E$ is prevented from flowing to ground on transistor Q5 by diode D2. This allows the noninverting and inverting inputs of amplifiers 50 and 52, respectively, to be pulled toward the supply voltage $V_{CC}$, causing the error voltage $V_E$ to go HIGH, while the output of amplifier 50 remains HIGH. The differences between the output voltages V1 and V2 creates a motor current that causes the motor M to rotate in a direction that releases the throttle throw arm 20 to the force of the bias spring 21, allowing the throttle valve to go "home" to the idle position.

An ancillary aspect of the servo control system 10 concerns instances when the error voltage $V_E$ is such that only a small amount of motor M operation is needed. It is then that the sawtooth waveform that rides on the top of the error voltage $V_E$ permits the motor drive circuit 16 to operate in a modulated "pulse mode" to provide a control that prevents overshoot of the system. For example, prior servo control systems can respond to small diviations from desired vehicle speed by a motor current no different from that supplied for large deviations. This tends to cause the motor M to overshoot and move the throttle valve more than desired. A modulated pulse mode supplies pulses to motor M, the width of the pulses being indicative of the amount of deviation. Thus, a small deviation will produce thin pulses and slight movement of motor M; larger deviations produce wider pulses, and greater motor movement. This can best be seen with reference to FIGS. 5A–5C, which diagrammatically illustrate the voltages and signals encountered in operation of the servo control system 10.

FIG. 5A represents the condition of the error voltages $V_E$ being between the band set by the resistance R34 and resistances R30 and R37 of FIG. 3 to create the voltage levels $V_H$ and $V_L$. Since the error voltage $V_E$ is greater than the voltage level $V_L$ the output $V_2$ of amplifier 50 will be HIGH. Similarly, with the error voltage $V_E$ is less than the voltage level $V_H$ the output $V_1$ of amplifier 52 will also be HIGH. This absence of a voltage difference causes the motor M to become immobile, a state in which it will remain until one or the other (but not both) of the voltages $V_1$ or $V_2$ go LOW.

If, on the other hand, the vehicle speed decreases relative to the desired set speed, the error voltage $V_E$ will respond accordingly and also decrease (relative to the voltage levels $V_L$ and $V_H$). FIG. 5B illustrates the condition of a small decrease or deviation from the desired speed. In this instance only the bottom peaks of the sawtooth waveform drop below the voltage level $V_L$, in which case the output voltage $V_2$ of amplifier 50 will go LOW during these excursions, creating a string of pulses. At the same time the output voltage $V_1$ produced by amplifier 52 is HIGH since the error voltage $V_E$ is less than the voltage level $V_H$. Thus, the motor M is commanded to rotate by the pulses to smoothly open the throttle valve (not shown), increase vehicle speed, and avoid overshoot due to momentum of the mechanics of the system.

In a similar fashion, if the vehicle speed increases slightly above that desired and set by the operator, it is the upper peaks of the sawtooth portion of the error voltage $V_E$ that will begin to transverse the voltage level $V_H$. This will cause the amplifier 52 to produce an output voltage $V_2$ in the form of a pulsed output illustrated in FIG. 5C (the output of amplifier 50, of course, as described above, remains HIGH).

As the deviation in either of the above cases increases, the pulses will begin to widen to cause the motor M to rotate more per pulse. However, as vehicle speed increases and the error voltage $V_E$ closes upon the desired range set by the voltage levels $V_L$ and $V_H$ the pulse widths of the pulses being produced will get narrower and throttle valve movement slows.

Referring once again to FIG. 3, illustrated therein, and discussed above, is a method of detecting when travel of a valve (or other fuel-air control elements, such as found in fuel injection systems) is halted at the full throttle stop. However, a similar situation can exist at the other limit of throttle travel, i.e., at the idle position. For example, assume that while in the cruise control mode the vehicle encounters a downhill incline. The vehicle speed will increase, causing a concomitant increase in the error voltage $V_E$ above the threshold $V_H$ and causing the output voltage $V_1$ to go LOW (while $V_2$ remains HIGH). The motor M will rotate in a direction that releases the throttle arm 20 (FIG. 1) toward the force of the bias spring 21, allowing the throttle valve (not shown) to move to the idle position. Unfortunately, the motor M may continue to rotate beyond that necessary to put the throttle valve in its idle position, until a stop (usually a part of the gear train 22) is encountered. As with the full-throttle position, if the drive circuit 16 continues to supply motor current to the motor M, damage to the motor M, the clutch C, gear train 22, or any combination of these elements can occur.

Figure 6:
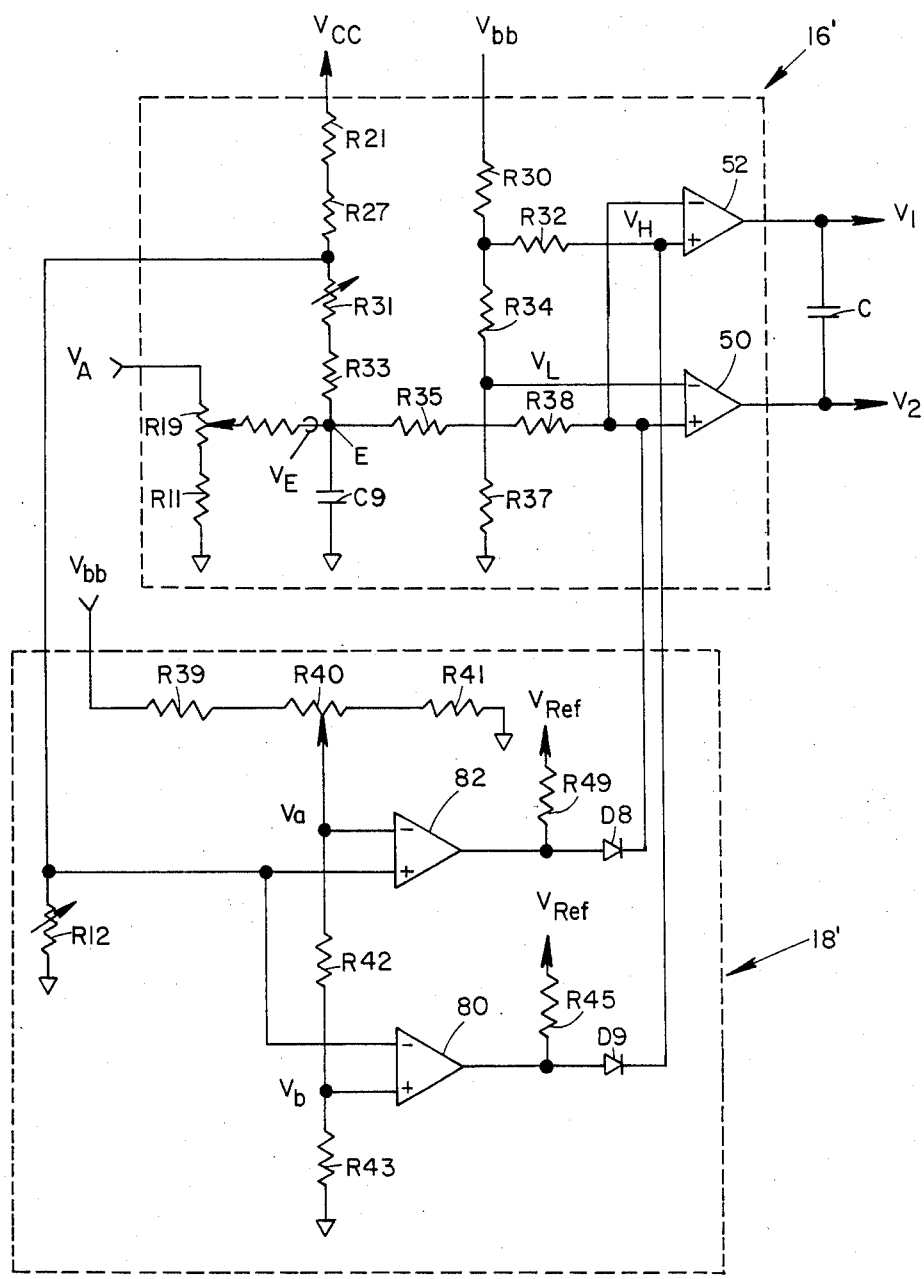
FIG. 6 is a schematic representation of the circuit used in connection with the alternative embodiment of the invention, employing a potentiometer to determine limits of throttle travel.

FIG. 6 illustrates a second embodiment of the present invention which can be combined with the first embodiment to correct the difficulty encountered in the idle position. Although the first embodiment could have multiple limit detection circuits to control the motor M when both the idle and full throttle position is reached, the preferred embodiment uses the second embodiment to limit the motor M when the throttle is at the idle position. This embodiment utilizes a variable resistor to monitor the position of the throttle valve, and to determine thereby when the throttle valve reaches either its full throttle or full idle position. However, this second limit detection circuit 18' of the second embodiment could also be used for detecting when a throttle valve is in its full throttle position.

As FIG. 6 illustrates, the second limit detection circuit 18' includes a pair of amplifiers 80 and 82 whose outputs are coupled to a reference voltage $V_{Ref}$ by resistors R45 and R49, respectively, and to the noninverting inputs of amplifiers 52 and 50, respectively, through blocking diodes D9 and D8, respectively. The noninverting input of amplifier 80 and the inverting input of amplifier 82 respectively receive threshold voltages set by a voltage divider network coupled to receive a bias voltage $V_{bb}$ comprising resistors R39, R41, R42 and R43, and potentiometer R40.

A servo potentiometer R12 is coupled to track movement of the throttle valve of the vehicle so that the resistance presented by the servo potentiometer R12 increases toward a maximum as the throttle valve is opened to its full-throttle position, and decreases to a minimum as the throttle valve moves to its idle position. A voltage is developed across the servo potentiometer R12 by coupling it to voltage source $V_{CC}$ via resistors R21 and R27 of the drive circuit 16'. In addition to providing a voltage indicative of the limits of the throttle valve movement, the voltage developed by the potentiometer R12 is coupled to a voltage node E and combined with the error voltage $V_E$ via a trimming potentiometer R31 and a resistance R33 to "damp" throttle movement commands. This damping function is similar to that described earlier performed by the resistor R27 and potentiometer R10 in FIG. 2. The remainder of the motor drive circuit 16' of FIG. 6 is identical in circuit configuration and function to that shown in FIG. 3.

During normal cruise control conditions, the voltage developed across the servo potentiometer R12 will normally be less than that applied to the inverting input of amplifier 82, but greater than that applied to the noninverting input of amplifier 80. That is, as long as the throttle valve (not shown) is positioned between its idle and full throttle positions, the voltage across the servo potentiometer R12 will be greater than the lower threshold voltage, Vb, but less than the upper threshold voltage $V_a$. The threshold voltages are adjusted to conform to the particular vehicle by potentiometer R40. Thus, during cruise conditions the outputs of both amplifiers 80 and 82 will be LOW.

Operation of the second limit detection circuit 18' is as follows: Assume, while under cruise control mode, a vehicle encounters an uphill sufficient to create an error voltage $V_E$ to cause the output of amplifier 50 to be LOW, while the output of amplifier 52 will be HIGH. If the error voltage $V_E$ so developed is sufficiently large, the motor drive circuit will provide a motor current that causes the motor M to open the throttle valve (not shown) to the full-throttle position.

The voltage divider network of resistors R39,41–R43 are set to develop an upper threshold voltage $V_a$ that is slightly less than the maximum voltage capable of being developed by the servo potentiometer R12 (when the throttle is moved to its full-throttle position). Ultimately, a point is reached when the throttle valve (not shown) approaches its full-throttle position and the voltage developed across the servo potentiometer R12 and applied to the noninverting input of the amplifier 82 will be greater than at the inverting input, causing the amplifier 82 output to go HIGH and pulling the noninverting input of amplifier 50 to a voltage greater than that applied to the noninverting input of amplifier 50, i.e., a voltage greater than $V_L$, but less than $V_H$. In turn, the output of the amplifier 50 will also go HIGH, the output of amplifier 52 will remain HIGH, and the potential difference is removed across the motor M (FIG. 3), terminating motor current thereto.

Assume now that the converse occurs, that the vehicle, while in cruise control mode, encounters a downhill stretch. If the downhill is sufficiently steep, the error voltage $V_E$ thereby developed will increase to a level that exceeds the threshold voltage $V_H$ that is applied to the noninverting input of the amplifier 52. Accordingly, the output of amplifier 52 will go LOW, while the output of amplifier 50 remains HIGH, creating a voltage difference across the motor M (FIG. 3) and a motor current that causes the motor M to drive in a direction to release the throttle valve so it may close. Again, as described above, movement of the throttle valve is accompanied by movement of the servo potentiometer R12 and a concomitant decrease in the voltage developed thereacross. The servo potentiometer R12 will ultimately reach a value that creates a voltage below the threshold voltage $V_L$, resulting in the output of the amplifier 80 traversing from a LOW to a HIGH. This HIGH is coupled by the block diode D9 to the noninverting input of the amplifier 52, pulling that input to a voltage level above that applied to the inverting input, and causing the output of the amplifier 52 to traverse from a LOW to a HIGH. Thereby, the potential difference and the motor current created thereby are removed from the motor M.

As mentioned above, and as is now evident to those skilled in this art, the circuitry shown in FIG. 6 for terminating motor current when the throttle valve (not shown) is released to travel to its idle position could also be used in combination with the circuitry of FIG. 3. In fact, this combination is preferred, particularly for the idle stop position.

A third embodiment has previously been described in the use of an electromechanical and torque limiting clutch C in the drive train 22.

A fourth embodiment is to employ a controlled acceleration circuit 100, as shown in FIG. 10. In operation, this circuit slows the action of the servo motor M when it is directed to open the throttle by the error voltage $V_E$. This slowing of the servo motor M is scaled to match the vehicle's acceleration rate, so that in use, the servo slowly opens the throttle and the vehicle's accelerates at a rate that closely tracks the rate of throttle opening but never exceeds it. Since the maximum "SET" speed of the cruise control system 10 is less than the maximum speed the vehicle is capable of, the motor M is never allowed or required to pull the throttle completely open thus, preventing it from reaching its mechanical limit.

However, the controlled acceleration circuit 100 does not have to be customized for installation in every motor vehicle. Applicant has found that if the circuit 100 is designed to match the acceleration rate of the slowest accelerating commerical automobile, that this rate is still sufficient to work satisfactorily in the cruise control systems of faster accelerating vehicles. In fact, Applicant has found that controlled acceleration circuits 100 which can accelerate any faster than this slowest vehicle standard will startle drivers or cause unnecessary fuel consumption.

The controlled acceleration circuit 100 receives a vehicle set speed voltage $V_A$ from an integrator circuit 112A similar to that shown in FIG. 3. The voltage $V_A$ across potentiometer 119 must flow through resistor R138 and capacitor C110, which form a delay circuit at the input of the high impedance emitter follower circuit consisting of transistor Q105 and resistor R139. This high input impedance prevents the loading of the delay circuit.

The output of the emitter follower Q105 appears across R139. This controlled acceleration output is applied to the input of the single pole filter R136 and C109 as before with the remainder of the circuit operating as previously described. The small voltage drop that occurs across Q105, because of its emitter follower configuration is compensated for by a slight readjustment of the calibrate control R129.

Experience has shown that while it is desirable to provide controlled acceleration, that the converse is true of deceleration, in that it should occur in step with the operator's desire. This rapid deceleration function is provided for by Q106. When the speed control potentiometer R119 wiper is moved in the direction toward R129 (greater voltage equals less speed), the base of Q106 becomes positive with respect to its emitter, causing it to conduct and apply the positive voltage on its collector to C110, the acceleration delay capacitor. This positive voltage is passed by Q105 and appears across R139 and results in the servo motor M instantly driving toward the idle stop position.

The small voltage drop across Q106 (VAST) allows very small changes (i.e., one or two miles per hour) to be made in the deceleration of the vehicle to accommodate driving needs such as matching the speed of a vehicle in front of the driven car, while allowing rapid deceleration for any large change required in deceleration. This has proven desirable from a safety and convenience standpoint.

Resistor R139 is a current limiting resistor for the base of Q106.

Although the invention has been described with particularity in the preceding embodiments, this was merely to teach one of ordinary skill in the art how to make and use the invention. Many modifications and/or substitutions are intended to fall within the scope of the invention, as that scope is defined by the following claims.

I claim:

1. In a system for maintaining the speed of a vehicle at a predetermined constant rate by controlling rotation of an electro-servo motor that is coupled to an element moveable between at least two positions by the servo motor for controlling the fuel-air mixture of the vehicle, the servo motor being responsive to a control current produced by a motor drive circuit to move the element, means for interrupting the servo motor operation when the element is relatively immoveable, comprising:
   element position indicating means operably coupled to said element for providing a signal having a value which varies with the position of said element;
   first circuit means for providing a first reference signal having a value representing when said element reaches a first extreme travel position, and for providing a second reference signal having a value representing when said element reaches a second extreme position of travel;
   first comparator means operatively coupled to said element position indicating means and said first circuit means for comparing the value of the signal produced by said element position indicating means to said first reference signal and for providing a signal indicating whether the value of said signal from said element position indicating means exceeds the value of said first reference signal;
   second comparator means operatively coupled to said element position indicating means and said first circuit means for comparing said signal from said element position indicating means to said second reference signal and for providing a signal indicating whether the value of said signal from said element position indicating means drops below the value of said second reference signal;
   second circuit means operably connecting said first and second comparator means to said motor drive circuit for terminating current flow to said servo motor in the event the signal from said first or second comparator means indicates said element has reached either the first or second extreme position of travel.

2. The apparatus as set forth in claim 1, wherein:
   the electro-servo motor is a DC motor having a pair of input terminals, and the drive circuit includes amplifier means adapted to receive an error voltage indicative of the speed of the vehicle relative to a desired vehicle speed, the amplifier means being coupled to the input terminals and responsive to the error voltage to produce a voltage difference across the input terminals to move the DC motor and the element coupled thereto.

3. The apparatus as set forth in claim 2, including means for causing the amplifier means to produce the voltage difference in the form of pulses, the pulses each having a pulse width indicative of a difference between the error voltage and a predetermined voltage level.

4. In a system for maintaining the speed of a vehicle at a predetermined constant rate by controlling rotation of an electro-servo motor that is coupled to an element moveable between at least two extreme positions by the servo motor for controlling the fuel air mixture of the vehicle, the servo motor being responsive to a control current produced by a motor drive circuit to move the element, means for controlling the servo motor operation comprising:
   a controlled acceleration circuit operatively coupled to the drive circuit for preventing an acceleration rate in excess of the maximum acceleration rate of said vehicle;
   the controlled acceleration circuit preventing movement of the element by the electro-servo motor to one of its extreme positions.

5. A system for maintaining the speed of a vehicle at a predetermined constant rate as set forth in claim 1, further comprising:
   first signal generating means for generating a signal representing actual vehicle speed;
   second signal generating means for generating a signal representing desired vehicle speed;
   third circuit means operably connected to said first and second signal generating means for comparing said signal representing actual vehicle speed to said signal representing desired vehicle speed, and for generating an error signal representing the difference between actual vehicle speed and desired vehicle speed;
   fourth circuit means operably connecting said element position indicating means to said third circuit means for varying said error siganl in response to the position of said element between said first and second extremes; and
   means operably connecting said fourth circuit means to said motor drive circuit for causing said motor drive circuit to adjust the position of said element in response to the combination of said error signal and said signal representing the position of said element thereby decreasing the degree of hunting by said servo motor.

6. In a system for maintaining the speed of a vehicle at a predetermined constant rate by controlling rotation of an electro-servo motor that is coupled to an element moveable between at least two extreme positions by the servo motor for controlling the fuel air mixture of the vehicle, the servo motor being responsive to a control current produced by a motor drive circuit to move the element, means for interrupting the servo motor operation when the element is relatively immoveable, comprising:
   comparator circuit means having first and second inputs and an output;
   first circuit means operably connecting said first input of said comparator means to said motor drive circuit for sensing the current being drawn by said servo motor and for providing a signal to said comparator means indicative of that current;
   second circuit means operatively connected to said second input of said comparator means for providing a reference signal to said comparator, said comparator being operative to provide an output signal indicating whether said signal applied to said first input exceeds said reference signal applied to said second onput;
   circuit means operatively connecting the output of said comparator circuit to said motor drive circuit to cause said motor drive circuit to interrupt the operation of said servo motor in the event the signal on said first input of said comparator means exceeds said reference signal on said second input.

7. In a system for maintaining the speed of a vehicle at a predetermined constant rate as set forth in claim 4, said controlled acceleration circuit comprising:
   first circuit means for providing a signal indicative of actual vehicle speed;
   second circuit means for operably coupled to said first circuit means providing a signal indicative of desired vehicle speed and for providing an error signal to said motor drive circuit representing the difference between actual vehicle speed and desired vehicle speed;
   third circuit means operably connected between said first circuit means and said second circuit means for delaying the signal from said first circuit means to said second circuit means;
   fourth circuit means operatively connected to said second circuit means for restricting the maximum desired vehicle speed to less than the maximum speed the vehicle is capable of; and
   means for adjusting the delay factor of said third circuit means such that the maximum permissable acceleration rate is below the acceleration rate of the vehicle whereby said element is not permitted to travel to one of its two extreme positions.

* * * * *